Nov. 8, 1932.    R. E. GRANT    1,886,540
FILM SOUND RECORDING
Filed Oct. 11, 1930
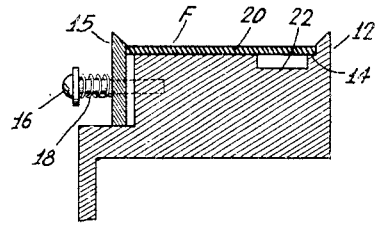
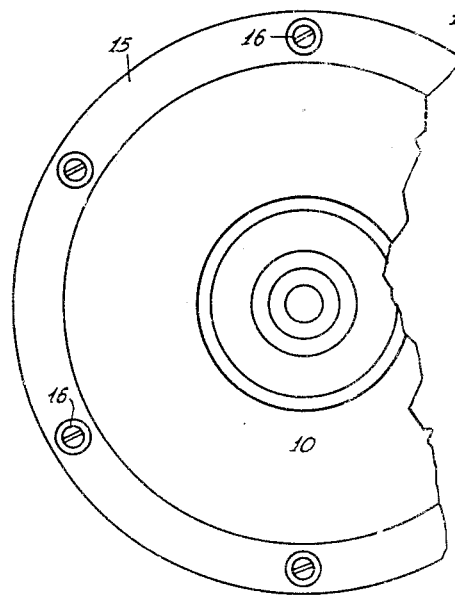
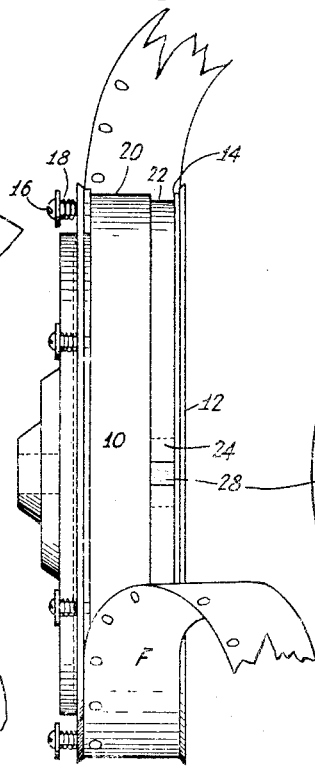
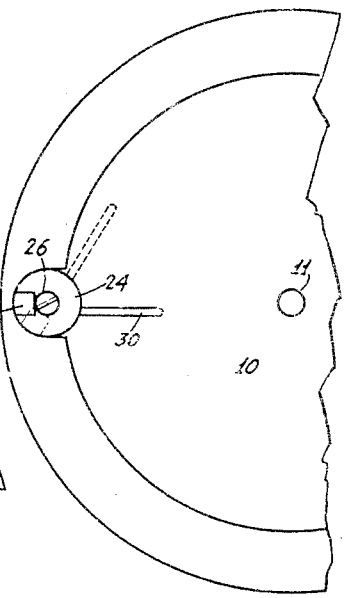
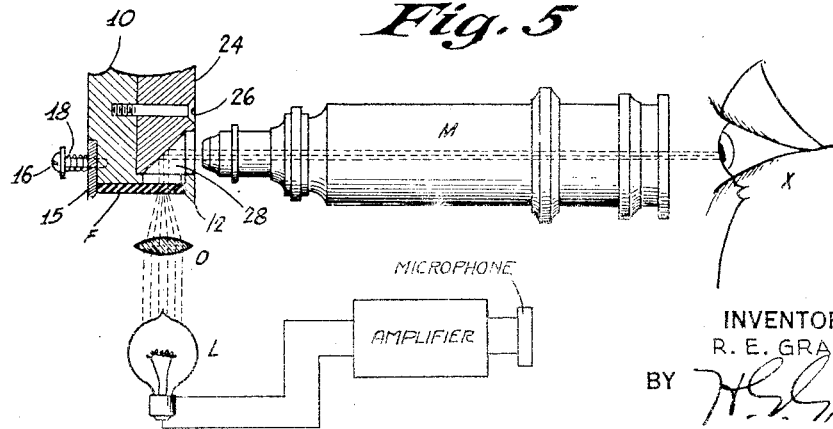
INVENTOR
R. E. GRANT
BY
ATTORNEY Patented Nov. 8, 1932

1,886,540

UNITED STATES PATENT OFFICE

ROYAL E. GRANT, OF YONKERS, NEW YORK, ASSIGNOR TO RADIO CORPORATION OF AMERICA, A CORPORATION OF DELAWARE

FILM SOUND RECORDING

Application filed October 11, 1930. Serial No. 488,011.

The object of this invention is to provide an improved sound recording apparatus.

A further object of this invention is to provide a means for sound recording which will permit improved accuracy of said sound recording.

Another object of this invention is to provide a film sound recording apparatus with means for observing the focussing of the sound recording optical system.

These and further objects of the invention will become apparent from the following specification taken in connection with the appended drawing.

The present invention comprises providing an optical arrangement so that the actual focus of the optical system, used in recording the sound of the film, may be observed prior to commencing the recording.

In a sound recording apparatus of the type involved, the light which may be either varied in accordance with the intensity of the sound being recorded to produce a variable density sound record, or shuttered by means of some galvanometer control to produce a variable area sound record, is focussed upon a moving film in the form of a very narrow spot of light almost infinitely small as respects the line of motion to the film. The accuracy of the sound record depends to a very large extent upon the actual focus of the beam of light, and because of the varying film thickness used, it may be necessary from time to time to shift the focussing of the recording system. It is very difficult, if not impossible, to observe the actual focus of the light upon the film, but the present apparatus is designed to permit the actual focus of the beam of light to be observed through the film.

For this purpose I provide, on the inside of the film drum, a reflecting prism which will reflect the image of the illuminated portion of the film into a microscope used by the observer adjusting the recorder. After the adjustment, the prism, which is movably arranged, is thrown in such a position as to prevent interference with the sound recording, and the recording commenced.

Having thus briefly described my invention, attention is invited to the accompanying figures in which:

Fig. 1 shows a side view of the sound film recording drum for supporting the film at the recording point;

Fig. 2 shows a side view of the same drum with a film shown broken away to disclose the reflecting prism;

Fig. 3 is a reverse view from Fig. 1 showing the sound recording drum and the observing prism;

Fig. 4 is a cross-section of the sound recording drum;

Fig. 5 is a cross-section of the sound recording drum showing the relative positions of the optical system and the microscope in use by the observer.

Reference is now more particularly invited to the figures in which like parts are designated by like reference numerals.

The sound recording drum 10 comprises a heavy rim portion and a relatively thin disc portion, and is pivoted at 11. This drum is revolved at the proper speed in any appropriate manner, the particular manner of driving said drum constituting no part of the present invention.

The drum is equipped with a stationary flange 12 having a shoulder 14 upon which one edge of the film F upon which the sound is being recorded is adapted to rest. The other side of the drum is equipped with a movable flange member 15 which is mounted on the screws 16 and spring pressed by means of the light springs 18 to remain in contact with the edge of the film F and cause it to be held in contact with the stationary flange 12. The film thus supported on the rotating drum 10, is moved past the optical system, roughly designated at O, by means of which an image of the light L modulated in accordance with the sound to be recorded is focussed upon the film F as it is moved by the drum. The optical system may be of any suitable type such, for example, as that disclosed in United States Patent 1,740,406 of E. W. Kellogg. The drum 10 has a portion 20 upon which the film is adapted to rest and a recessed portion 22 opposite the point at which the sound is recorded at the film F. This recessed portion is for the purpose of eliminating the scratching of the film which might otherwise occur due to slip between the film and the drum, and is also to avoid accumulation of dirt or particles of emulsion causing the film to ride unevenly and move out of focus during the recording. The surface of the recess 22 is coated with a flat or dull black paint to eliminate reflection which might otherwise fog the film.

At one portion of the drum 10, near the periphery, is disposed a small cylinder 24 pivoted by means of the screw 26 to the drum. The tension of the screw 26 is such as to permit ready rotation of the cylinder 24 by means of the handle 30 as will be described hereinafter.

In a recess in the surface of the cylinder 24 is a reflecting prism 28. The cylinder 24 may be moved by the handle 30 so that one face of the reflecting prism 28 will face the film F and the other face of the prism will face out through the top of the cylinder. Thus when the cylinder 24 is in the position shown in heavy lines in Fig. 3, and also in the position shown in Fig. 5, the image of the light focussed by optical system O upon the film F may be observed by means of the microscope M by an observer at X.

Having thus described my invention, I will now briefly describe its operation. Before the commencement of recording, the cylinder 24 is moved to the position shown in heavy lines in Fig. 3, and the image of the recording light is focussed until the desired focus is obtained, as determined by the observer X using the microscope M. When the proper adjustments have been made, the cylinder 24 is turned as indicated in the dotted lines in Fig. 3 and the recording is commenced.

Having thus described my invention, attention is invited to the fact that various modifications may be made therein that come within its scope, and that I am not to be limited to the specific embodiment shown and described for the purpose of illustration, but by the actual scope of my invention as set forth in the appended claims.

I claim:

1. Apparatus for photophonographic sound recording which comprises a sound recording drum adapted to continuously move a film upon which the sound is being recorded, a recording light, an optical system for focussing an image of said recording light upon said film while upon said drum, a recess in said drum back of the sound recording point, a cylinder rotatably mounted in said drum, means for rotating said cylinder relative to said drum, a prism mounted in said cylinder adapted to reflect said image in the direction of the axis of said drum, and microscopic means for observing the reflection of said image whereby the focus may be properly adjusted prior to commencement of recording.

2. A photophonographic sound recording apparatus which includes a drum adapted to support a film upon which the sound is being recorded, a light source adapted to be controlled in a suitable manner by the sound being recorded, optical means for focussing the image of said light upon the moving film while upon said drum in the form of a narrow slit, a cylinder mounted upon said drum and rotatable relative thereto, a prism mounted upon said cylinder adapted to reflect said image, and microscopic observing means adapted to observe the reflection of said image whereby the adjustment of said optical means may be observed.

3. A photophonographic sound recording apparatus which includes a drum upon which a film upon which the sound is being recorded is adapted to be supported, a fixed flange against which one edge of said film is adapted to abut, a supporting abutment for one edge of said film, a recessed portion of said drum opposite the path of the sound record, and a spring pressed flange member adapted to abut the other edge of said film to keep it in contact with the first mentioned flange.

4. A photophonographic sound recording apparatus which comprises a drum adapted to be continuously rotated and adapted to support the film upon which the sound is being recorded, a recording light, an optical system for focussing an image of said recording light upon said film, a cylinder rotatably mounted within said drum, reflecting means mounted in said cylinder and adapted to reflect said image, and microscopic means adapted to observe the image thus reflected to enable the proper adjustment of the optical system.

5. A photophonographic sound recording apparatus which includes a sound recording drum upon which the film upon which the sound is being recorded is adapted to be supported, a recording light, means for focussing an image of said light upon said film, reflecting means arranged within said drum for reflecting said image, and observing means for observing the image of said recording light upon said film.

6. Apparatus for photophonographic sound recording which comprises a drum for supporting the film upon which the sound is being recorded, a recording light, means for focussing an image of said light upon said film, and light reflecting means disposed within said drum to permit the observation of said image of said light source upon said film to permit adjustment of said focussing means.

7. A photophonographic sound recording apparatus which includes means for continuously moving the film upon which the sound is being recorded, a recording light, means for focussing the image of said light upon the film, means mounted on said film moving means for reflecting said image, and means for observing the focus of said image whereby it may be properly adjusted.

ROYAL E. GRANT.